March 18, 1969  D. J. VONDRAN  3,433,121
SPRING CLIP FASTENER
Filed Dec. 19, 1966

INVENTOR
DANIEL J. VONDRAN
BY Mueller, Aichele & Raumer
ATTORNEYS

United States Patent Office 3,433,121
Patented Mar. 18, 1969

3,433,121
SPRING CLIP FASTENER
Daniel J. Vondran, Chicago, Ill., assignor to Motorola, Inc., Franklin Park, Ill., a corporation of Illinois
Filed Dec. 19, 1966, Ser. No. 602,865
U.S. Cl. 85—36
Int. Cl. F16b 37/00, 17/00, 39/28
3 Claims

ABSTRACT OF THE DISCLOSURE

The fastener includes a pair of apertured, parallel legs connected together by a resilient portion which maintains the apertures in non-alignment when the fastener is in a relaxed position. Stressing the resilient portion reciprocates the legs to align the apertures and allow passage of a stud therethrough. Upon release, the legs are drawn in parallelly opposing directions so that the fastener engages the stud by shearing action.

Background of the invention

A spring clip fastener of the type to be described although having unlimited applications, is particularly useful in an environment where rotation of a nut is undesirable. For example, mounting a loudspeaker to its baffle requires passing a number of studs through apertures in the rim of the speaker and then consecutively attaching nuts thereto. In order to speed up production, a power driver is generally employed and if the first nut is drawn down with sufficient torque, the speaker rim may exert pressure on the speaker gasket and become embedded in the baffle so as to damage both elements. When the rest of the nuts are subsequently tightened, the resulting moment may cause the rim to bend and become distorted. Such deformation can contribute to inferior sound reproduction by the loudspeaker. Some of the prior fastening devices having clip-on features require rotation to insure a secure connection which consumes production time and requires room to permit rotation. Additional drawbacks of certain presently known fastening devices are that they are adapted for use only with threaded studs, that the device is not reusable after removal and that a special tool is needed to assemble the device.

Summary of the invention

It is, therefore, an object of this invention to obviate damage to a loudspeaker or its baffle during the fastening procedure.

Another object is to provide a spring clip fastener which is usable with either threaded or non-threaded studs of any desired composition.

Another object is to provide a spring clip fastener which is reusable after removal thereof.

A further object is to provide a simple and inexpensive fastener to secure a loudspeaker to a baffle in such a manner that the entire assembly may take place rapidly to expedite production.

A further object is to provide a spring clip fastener which does not require rotation but rather may be slipped on to a stud and at the same time obtain great retention power.

A further object is to provide a spring clip fastener which does not require a special tool for application or removal.

In a preferred embodiment, the spring clip according to this invention includes a pair of substantially parallel L-shaped portions each having first legs and apertured second legs and a resilient portion connecting the second legs together. The resilient portion maintains the first legs spaced from one another and also maintains the apertures in non-alignment when the clip is in a relaxed position. The first legs form gripping surfaces to be flexed toward one another to reciprocate the second legs and cause the apertures to tend towards alignment so that a stud may pass through the apertures. When the first legs are released, the resilient portion draws the second legs in parallelly opposing directions to cause the apertures to tend towards non-alignment with the result that the clip may engage and retain the stud by shearing action.

Description of the preferred embodiment

Figure 1:
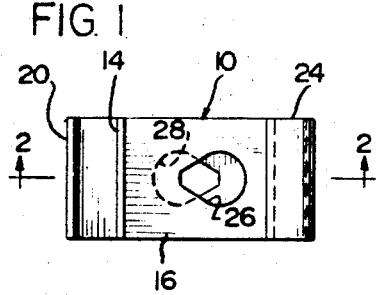
FIG. 1 is a top plan view of the spring clip according to this invention.
Figure 2:
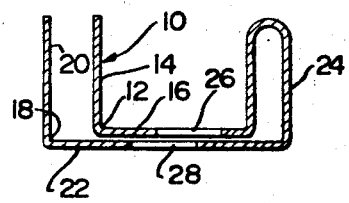
FIG. 2 is a cross-sectional view of FIG. 1 taken along the line 2—2.

Referring now to FIGS. 1 and 2, the spring clip fastener 10 includes an L-shaped portion 12 having legs 14 and 16, an L-shaped portion 18 having legs 20 and 22, and a resilient U-shaped portion 24 connecting legs 16 and 22 together. An aperture 26 in leg 16 and an aperture 28 in leg 22 are maintained in non-alignment by the action of U-shaped portion 24 when the fastener 10 is in a relaxed position. Legs 14 and 20 form gripping surfaces which, when flexed toward one another by a pair of pliers, for example, stress resilient portion 24 and reciprocate legs 16 and 22 so that apertures 26 and 28 tend towards alignment to allow passage of a stud therethrough. When the legs 14 and 20 are released, the resilient portion 24 draws legs 16 and 22 in parallelly opposing directions so that the apertures tend towards non-alignment whereby the left hand side of aperture 26 and the right hand side of aperture 28 engages and retains respective sides of a stud by shearing action. It may be appreciated that almost the entire force is in a horizontal direction so that the retention is excellent whether the stud is threaded or not.

In order to provide even greater retention power, the apertures may have the shape shown in FIG. 1, that is a semicircular portion and a substantially triangular portion with the apex of the triangular portion of aperture 26 directed towards legs 14 and 20 and the apex of the triangular portion of aperture 28 directed towards U-shaped portion 24. Such a construction provides a large opening when the fastener is in a flexed or stressed condition to allow passage of the stud therethrough. The size of the opening created by the two apertures when the fastener is in a relaxed condition is smaller than the diameter of the stud so that when the legs 14 and 20 are released, there are four distinct points which grip the stud, that is a point on each of the sides of the triangular portion of aperture 26 and a point on each of the sides of the triangular portion or aperture 28.

Figure 3:
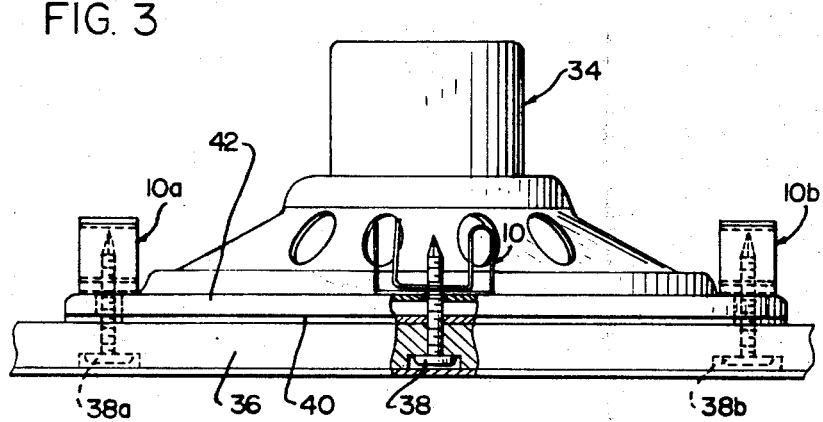
FIG. 3 is a side elevation view showing a loudspeaker, baffle, and spring clip fasteners securing the loudspeaker to the baffle.

The loudspeaker 34 in FIG. 3 is mounted onto baffle 36 by studs 38, 38a and 38b and spring clip fasteners 10, 10a and 10b (a fourth stud and fastener not shown are located directly in back of the speaker 34). A gasket 40 is cemented onto the loudspeaker rim 42 to provide protection for the speaker against vibrations. Assume for the moment that the loudspeaker is to be attached with nuts by use of a power driver. When the first nut is drawn down on stud 38a, the left hand portion of the loudspeaker 34 may tip downwards so as to compress the gasket 40 and embed the left hand portion of the rim 42 into the baffle 36 thereby damaging both the gasket and the baffle. When a nut is subsequently attached to stud 38b, the resulting moment may cause the rim 42 to bend and become distorted. Such deformation may contribute to inferior sound reproduction of the loudspeaker.

To overcome this, the spring clip fasteners according to this invention are employed in which case a simple tool such as a pair of pliers may be used to assemble them. Since the tool is a hand held device, there is no undue pressure to cause speaker deformation and at the same time there is a decrease in production time because of the simple operation involved of merely slipping the fastener on. After the fasteners are released, no rotation thereof is necessary due to the shearing action of legs 16 and 22, and in fact, the studs need not even be threaded because the strong shearing forces insure excellent retention. Removal of the loudspeaker 34 from the baffle requires the simple steps of flexing the gripping surfaces 14 and 20 towards one another and pulling upwards and since there is no damage to the fasteners by this operation they may be reused. The stud itself may have a cheaper construction because it need not have to withstand the large torque created by a power driver on a threaded nut. Also, the stud may have any desired composition such as plastic or metal.

Figure 4:
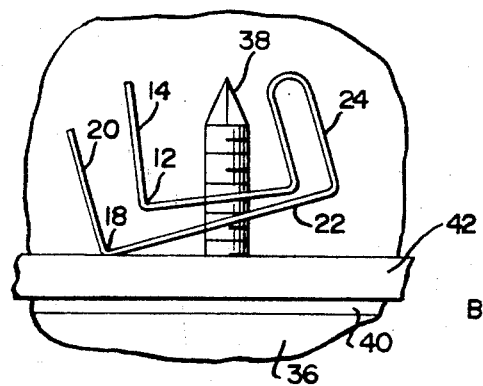
FIG. 4 is a partial side elevation view of a loudspeaker baffle, gasket and a spring clip fastener in a tilted position.

A further advantage of the described fastener is illustrated in FIG. 4. In a rapid assembly operation which, of course, is desirable in minimizing production costs, the workmen may not allow the bottom leg 22 to be flush against the speaker rim 42 before he releases the gripping surfaces 14 and 20. Due to the forces created by the U-shaped portion 24, the corner of L-shaped portion 18 tilts downward to automatically exert pressure on the speaker rim 42 and thereby rigidly secure the speaker rim 42 to the baffle 36.

What has been described, therefore, is a spring clip fastener which is adapted to engage a plain or threaded stud by shearing action. The tool for attaching the fastener may not be especially manufactured, the fastener itself is reusable, it does not require rotation to provide a secure connection and the entire assembly may take place quite rapidly.

I claim:

1. A spring clip fastener adapted to be fastened to a stud, said fastener including; a pair of substantially parallel first legs positioned opposite and spaced apart from each other, a pair of substantially parallel apertured second legs positioned opposite each other, each of said second legs being joined to a separate one of said first legs forming a pair of L-shaped portions with said first legs being positioned on the same side of said apertures and extending in the same direction from said second legs, and a resilient portion having a U-shaped construction and a pair of further legs respectively and integrally connected to said apertured second legs, said pair of further legs being connected to said second legs on the opposite side of said apertures from said first legs and extending in the same direction as said first legs, said resilient portion acting to maintain said first legs spaced from one another and to maintain said apertures in non-alignment with the fastener in a relaxed condition, said first legs forming gripping surfaces to be flexed toward one another to reciprocate said second legs and cause said apertures to tend toward alignment in order that the stud may pass through the apertures, upon release of said first legs said resilient portion draws said second legs in parallelly opposing directions to cause said apertures to tend towards non-alignment, whereby the fastener may engage the stud by shearing action.

2. The spring clip fastener according to claim 1, in which said apertures are positioned to create an opening through said second legs, the diameter of said apertures and the degree of non-alignment thereof where the clip is in said relaxed condition being selected to cause the size of said opening to be less than the diameter of the stud.

3. The spring clip fastener according to claim 1 in which the apertures in said second legs have a substantially triangular shape with the apex of one directed towards said resilient portion, the apex of the other directed towards said first legs, whereby the apexes may respectively bear against opposite sides of the stud upon release of said first legs from a flexed condition.

References Cited

UNITED STATES PATENTS

| | | | |
|---|---|---|---|
| 1,000,657 | 8/1911 | Woodward. | |
| 1,058,912 | 4/1913 | Shaw | 85—36 |
| 1,167,780 | 1/1916 | Moses | 24—115.7 |
| 1,733,415 | 10/1929 | Lawley | 24—261 |
| 2,334,801 | 11/1943 | Zimmerman | 24—257 |
| 2,338,754 | 1/1944 | Bonas | 85—36 |
| 2,352,392 | 6/1944 | Kost | 85—36 |
| 2,380,359 | 7/1945 | Ballou | 85—36 |
| 3,261,357 | 7/1966 | Roberts et al. | |

EDWARD C. ALLEN, *Primary Examiner.*

U.S. Cl. X.R.

151—21; 340—174